US008826460B2

(12) United States Patent
Wang et al.

(10) Patent No.: US 8,826,460 B2
(45) Date of Patent: *Sep. 2, 2014

(54) DATA EXCHANGE BETWEEN APPLICATIONS OF AN ELECTRONIC DEVICE

(71) Applicant: Google Inc., Mountain View, CA (US)

(72) Inventors: Zheng Wang, Mountain View, CA (US); David Hearnden, Mountain View, CA (US); Andrew Foster, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/848,379

(22) Filed: Mar. 21, 2013

(65) Prior Publication Data

US 2013/0318633 A1    Nov. 28, 2013

Related U.S. Application Data

(63) Continuation of application No. 13/479,843, filed on May 24, 2012, now Pat. No. 8,434,157.

(51) Int. Cl.
*G06F 7/04* (2006.01)
*G06F 21/60* (2013.01)
*G06F 21/00* (2013.01)

(52) U.S. Cl.
CPC ............... *G06F 21/60* (2013.01); *G06F 21/00* (2013.01)

USPC .......................................................... 726/29

(58) Field of Classification Search
USPC ................ 726/27, 29, 30; 713/164, 165, 193
See application file for complete search history.

(56) References Cited

U.S. PATENT DOCUMENTS

| 7,200,862 | B2 | 4/2007 | Murching et al. |
| 7,277,408 | B2 | 10/2007 | Sorsa |
| 2004/0122774 | A1 | 6/2004 | Studd et al. |
| 2009/0089803 | A1 | 4/2009 | Biggs |
| 2009/0328205 | A1 | 12/2009 | Ims et al. |
| 2012/0054841 | A1 | 3/2012 | Schultz et al. |
| 2012/0159578 | A1 | 6/2012 | Chawla et al. |
| 2012/0254853 | A1 | 10/2012 | Aggarwal et al. |

OTHER PUBLICATIONS

Yang, "Data Storage, ContentProvider, Security/Permission" published Jul. 17, 2009, published at http://www.androidside.com/data/file/B46/765580967_I7TKf8O2_android_app_lecture_note_3st_of_5days.pdf.

*Primary Examiner* — Beemnet Dada
(74) *Attorney, Agent, or Firm* — Morris & Kamlay LLP

(57) ABSTRACT

An electronic device includes a requesting application and a hosting application. When the requesting application requests permission from the hosting application to access a category of data, the device identifies the requesting application and the permission request. The device awaits a user input to determine whether the user will permit the requesting application's request to be granted.

21 Claims, 4 Drawing Sheets

DATA EXCHANGE BETWEEN APPLICATIONS OF AN ELECTRONIC DEVICE

RELATED APPLICATIONS AND CLAIM OF PRIORITY

This patent document claims priority to, and is a continuation of, U.S. patent application Ser. No. 13/479,843, filed May 24, 2012, titled "Data Exchange Between Applications of an Electronic Device."

BACKGROUND

In some mobile electronic devices, content providers are the only way to share data between applications because the electronic devices do not include a common storage area that all applications may access. A content provider acts like a gateway/interface of a hosting application, allowing a third party application to gain access to the hosting application's data. Accordingly, content providers allow data associated with one application (a hosting application) to be accessed by other applications (requesting applications). A number of content providers may exist for storing and retrieving common data types, such as audio, video, images and personal contact information.

The content providers may be queried (requested) for the data they contain. The data that the content providers provide, responsive to the request, may be stored at a server in a network. A user of an electronic device may wish to keep some of this data associated with the hosting application private. Accordingly, the user may not want to permit a requesting application of the electronic device access to a portion of the data of the hosting application.

This document describes methods and systems that are directed to solving at least some of the problems described above.

SUMMARY

In an embodiment, an electronic device includes a processor, a computer-readable memory, and an application that requests permission to access a category of data from a hosting application of the electronic device. The request includes a requesting application identifier that identifies the requesting application and a category identifier that identifies a category of data. A display, audio output or other output of the electronic device presents an identity of the requesting application and the request for permission to access the category of data. A processor of the electronic device detects an input, and the input is responsive to the presented identity of the requesting application and the request. The hosting application receives an instruction corresponding to the detected input, and the processor determines whether the received instruction permits the requesting application to access to the category of data. The hosting application permits access to the category of data responsive to the determination by the processor to permit access. The electronic device communicates a result to the requesting application indicating that the requesting application is permitted to access the category of data. The requesting application then requests data corresponding to the category of data responsive to the result.

Optionally, an operating system of the electronic device may receive the request for permission to access the at least one category of data from the requesting application. If so, the operating system may activate a permission activity of the hosting application in response to the request for permission. The permission activity displays the identity of the requesting application of the electronic device and the category of data.

Optionally, the requesting application identifier may correspond to a requesting application package name, and the data category identifier may correspond to a universal resource identifier. If so, the hosting application may retrieve the requesting application package name responsive to the received instruction, and the processor may determine whether the requesting application package name is permitted to access the category of data corresponding to the universal resource identifier. When retrieving the requesting application package name and permitting access to the category of data, the hosting application permission activity may perform the activities. The operating system may confirm with the hosting application permission activity that the requesting application corresponding to the requesting application package name is permitted to access the category of data corresponding to the universal resource identifier. When communicating the result to the requesting application, the hosting application permission activity may communicate the result to the operating system prior to the operating system communicating the result to the requesting application.

Optionally, the operating system may extract data from the hosting application corresponding to the category of data. The requesting application may receive the extracted data from the hosting application corresponding to the category of data. The hosting application may include a hosting application content provider. If so, the step of extracting data from the hosting application may include extracting data from the hosting application content provider, and the step of receiving the extracted data may include receiving the extracted data from the hosting application content provider.

Optionally, the device may initiate the request for permission to access the category of data from the hosting application in response to receiving an indication that data which corresponds to the category of data is at the hosting application. The method also may include initiating the request for permission to access the category of data from the hosting application in response to activation of the requesting application.

In an alternate embodiment, a computer-readable medium contains programming instructions that cause a processor to request permission to access at least one category of data from a hosting application. The hosting application causes its electronic device to output a message, wherein the message includes an identity of the requesting application and the request for permission to access the at least one category of data. The instructions cause a processor of the electronic device to detect an instruction received at a user interface of the electronic device, responsive to the message. Based on the detected instruction, the processor determines whether to permit the requesting application access to the category of data.

In an alternate embodiment an electronic device includes: a hosting application having data corresponding to at least one category of data; a requesting application configured to makes a request for permission to access the at least one category of data from the hosting application; a user interface configured to receive user instructions from a user of the electronic device; a display or other output configured to present messages to a user of the electronic device; a processor; and a memory. The memory has instructions that, when executed, instruct the processor to: (i) detect the request of the requesting application for permission to access the at least one category of data from the hosting application; (ii) output an identity of the requesting application and the request for permission to access the at least one category of data; (iii) detect an instruction received at a user interface of the electronic device, responsive to the displayed message; and (iv) determine whether to permit the requesting application to access the at least one category of data based on the detected instruction.

Optionally, in the embodiment described above, the instructions that, when executed, cause the device to out a message include instructions to prompt a user to select between: (i) permitting the requesting application to access the category of data; and (ii) denying the requesting application access to the category of data. The user interface may be configured to receive a user instruction permitting the requesting application to access the at least one category of data and/or a user instruction denying the requesting application access to the at least one category of data.

Optionally, the electronic device may also include a hosting application permission activity that permits access to the at least one category of data when the processor determines that the detected instruction is an instruction to permit access to the category of data. The hosting application permission activity may deny access to category of data when the processor determines that the detected instruction is an instruction to deny access to the at least one category of data. The device also may include a hosting application content provider configured to provide, to the requesting application, data corresponding to the category of data when the processor determines that the detected instruction is an instruction to permit the requesting application access to the category of data. The device also may include an operating system that communicates with the hosting application, the requesting application and the computing device. The operating system may be configured to activate the hosting activity permission activity responsive to the request of the requesting application, communicate a result of the determination by the processor to the requesting application, and receive data from the hosting application when the processor determines that the detected instruction is an instruction to permit access to the category of data.

DETAILED DESCRIPTION

As used in this document, "a network" may be a wired or wireless communications network such as a local area network, a wide area network, an intranet, the Internet or another network.

A "hosting application" refers to any application having data that is requested by a requesting application.

A "requesting application" refers to any application requesting data from a hosting application.

A "hosting application permission activity" refers to one or more instructions that permit or deny access to data of the hosting application.

A "hosting application content provider" refers to one or more instructions that provide data from the hosting application to other sources.

An "electronic device" refers to a device having a computer, a processor and/or any other component, device or system that performs one or more operations according to one or more programming instructions.

This disclosure is not limited to the particular systems, devices and methods described, as these may vary. Also, the terminology used in this document is only for the purpose of describing the particular versions or embodiments only, and it is not intended to limit the scope.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to."

Figure 1:
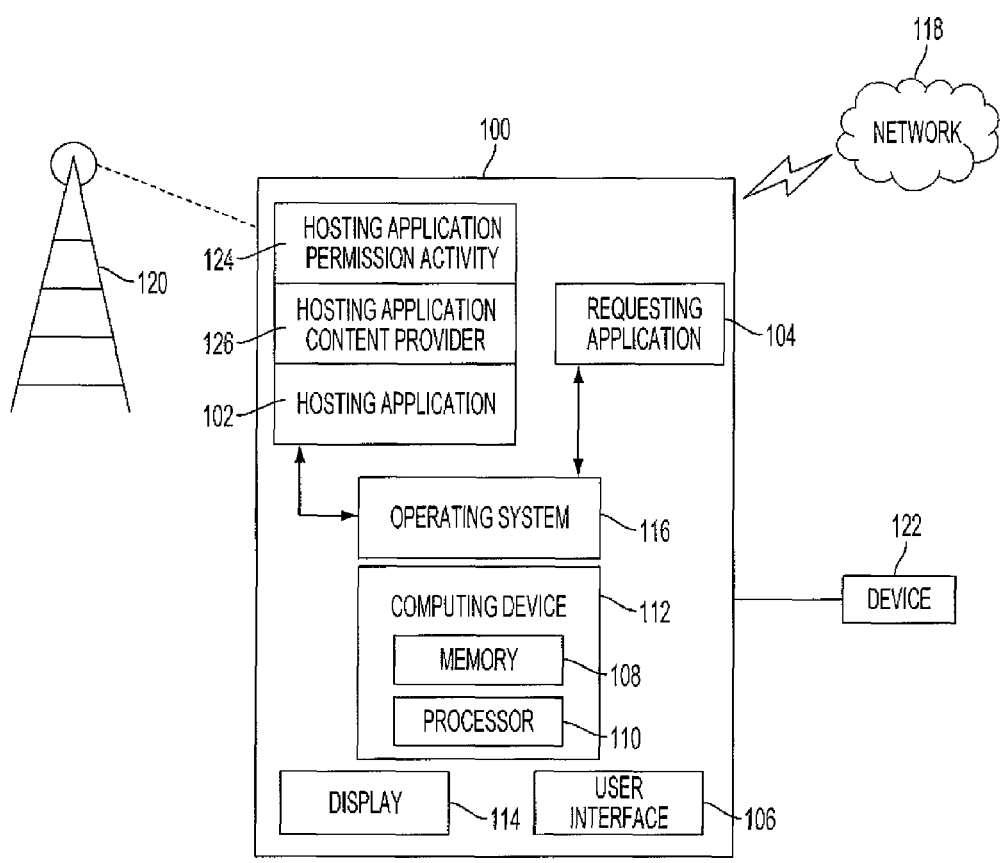
FIG. 1 illustrates an electronic device.

FIG. 1 illustrates an example of an electronic device 100. Examples of suitable electronic devices include portable devices such as mobile phones, personal digital assistants, tablet computers, e-books, portable computers and the like. The embodiments described in this document relate to electronic devices that may include a user interface. For example, the electronic device 100 may include a user interface 106 configured to receive user instructions from a user of the electronic device 100 and a display 114 configured to display information to the user. The user interface may include a touch-sensitive input component that is integrated with the display, such as a capacitive, resistive or other type of touch screen. Alternatively, the touch-sensitive component may be an item of hardware that is separate from the display, touch as a touch pad or trackpad, such as a keyboard and a mouse.

The electronic device 100 also includes a hosting application 102 having data that corresponds to at least one category of data and a requesting application 104 that makes a request for permission to access the at least one category of data from the hosting application.

The electronic device 100 also includes a computing device 112 having a processor 110, a tangible, computer-readable memory 108, and program instructions that implement a method of exchanging data between the hosting application 102 and the requesting application 104. In some embodiments, memory 108 is configured to store the instructions. Processor 110 may also receive instructions directly by the user interface 106. The instructions may instruct the processor 110 to detect a request of the requesting application for permission to access the at least one category of data from the hosting application 102 and output a message to the user the electronic device 100. The device may output the message via a display, an audio output such as a speaker or headphone jack, or a tactile mechanism such as a button or haptic element. The message may indicate (i) an identity of the requesting application 104 and (ii) the request for permission to access the at least one category of data. The instructions may instruct the processor 110 to detect an instruction received at a user interface 106 of the electronic device 100, responsive to the message and determine whether to permit the requesting application 104 access to the at least one category of data based on the detected instruction.

In other embodiments, instructions may be stored in a remote storage location such as a networked server or a cloud storage device. If the items are stored remotely, the hosting application may retrieve them from the remote storage location via one or more communication ports. The server may include a web server, a server, a minicomputer, a mainframe computer, a personal computer, a mobile computing device, or other such device. The tangible, computer-readable memory 108 may include a collection of one or more devices, each having tangible computer-readable memory that stores data in a structured format, such as one or more databases, tables, or other computer-readable files.

The electronic device 100 also includes an operating system 116 that communicates with the hosting application 102, the requesting application 104 and the computing device 112. The operating system may be any one of a variety of operating systems used to perform tasks, such as processor management, memory management, device management, storage management, application interface management and user interface management as the hosting application 102, the requesting application 104 and input instructions require transmitting information to the processor 110, memory, storage and input/output (I/O) bandwidth. For example, an operating system may be an Android operating system performing tasks on a wireless Android electronic device.

The electronic device 100 may wirelessly receive data from network 118 and broadcast tower 120. The electronic device 100 may also receive data from a wired source, such as through device 122, which may be a desktop or a client.

The electronic device 100 may also include a hosting application permission activity 124 that permits access to the at least one category of data when the processor 110 determines that a detected instruction via user interface 106 is an instruction to permit access to the at least one category of data. The hosting application permission activity 124 may also deny access to the at least one category of data when the processor 110 determines that the detected instruction is an instruction to deny access to the at least one category of data.

The embodiments described in this document may enable a secure process allowing users to explicitly permit a requesting application access to a category of data of another application. Accordingly, an application will not be permitted access to the category or scope of data without the user's acknowledgement of the specific category of data requested to be accessed. Further, although a network may be used by the electronic device to receive data, a requesting application of an electronic device may request access to a category of data from a hosting application of the electronic device, receive permission to access the category of data and receive data corresponding to the category of data without requiring a connection to a network.

Figure 2:
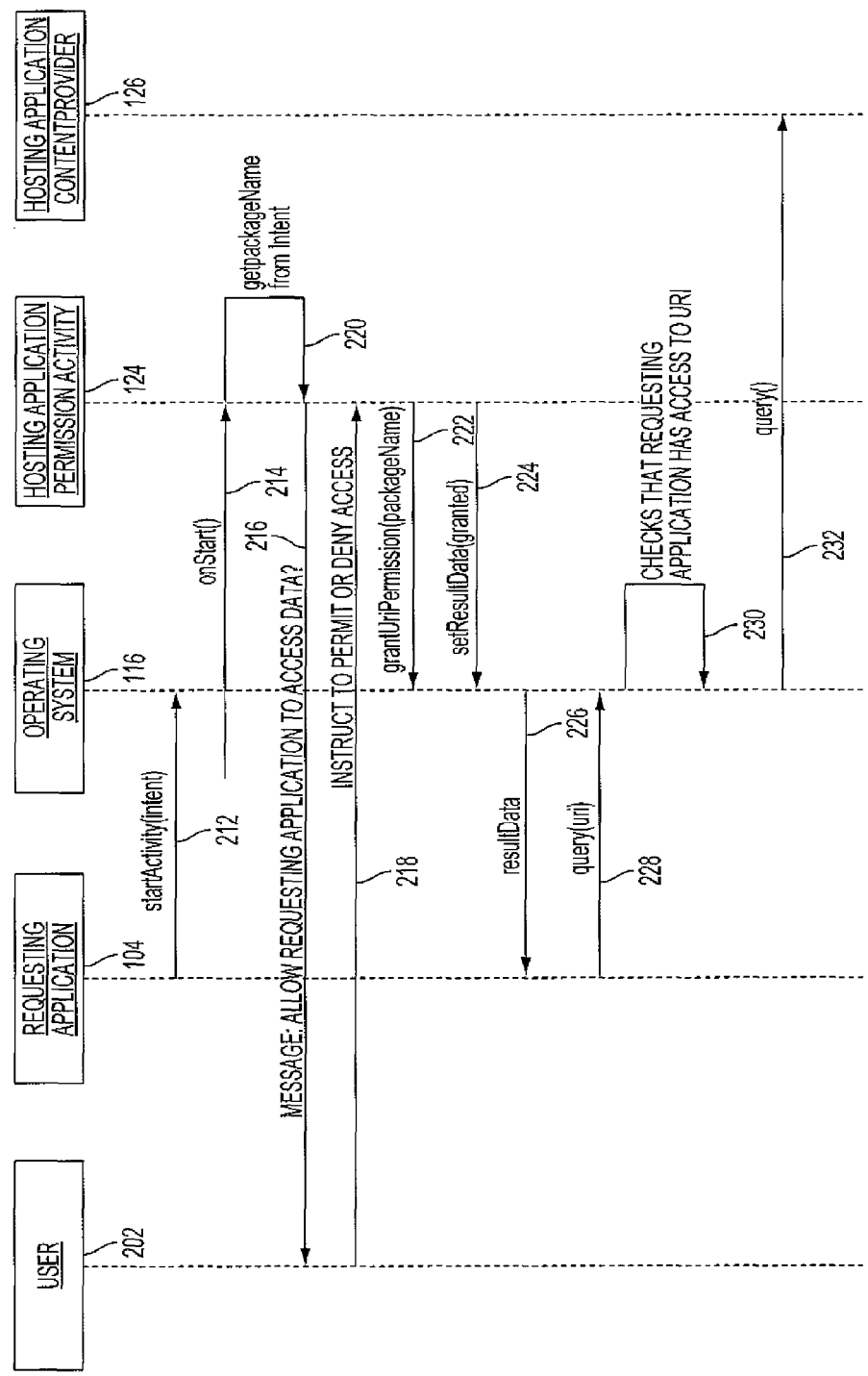
FIG. 2 is a system flow diagram illustrating steps of a method of exchanging data between applications of an electronic device.

FIG. 2 is a system flow diagram illustrating steps of a method of exchanging data between applications of an electronic device. Referring to FIG. 2, the system includes a user 202 of an electronic device, a requesting application 104 of the electronic device, an operating system 116 of the electronic device, a hosting application permission activity 124 and a hosting application content provider 126.

Hosting applications may include any application having data that is requested by a requesting application. An example of a hosting application may be an application that stores data corresponding to a user's recent activity. For example, the hosting application may store video data that includes data identifying recently viewed videos. The video data may also include video data identifying what portion of a video has been watched. Hosting applications may also store other types of data, such as document data or text data that include data identifying recently viewed documents and articles. Hosting applications may receive the stored data from a network, from a user interface and from sources of the electronic device without requiring a user interface or a network. The data stored by the hosting application may be provided to a requesting application by a hosting application content provider. A hosting application permission activity may be used to permit or deny access to the stored data of the hosting application.

Requesting applications may include any application seeking data from a hosting application. Examples of requesting applications may include applications providing videos or images, such as YouTube, e-mail applications, such as Gmail, and map applications, such as GoogleMaps. Requesting applications may also receive data from a network, from a user interface and from sources of the electronic device without requiring a user interface or a network.

In addition, the present disclosure is not intended to facilitate the unauthorized collection of user data by a third party, nor is it intended to jeopardize the privacy of the user and the user's data and actions. Rather, the disclosure is intended to facilitate the transfer of applications that are related or controlled by a single entity and/or subject to a single user account, or to a third party only if authorized by a user in accordance with the user's privacy preferences.

The embodiments described in this document will refer to the hosting application as an application that stores data corresponding to a user's activity. The embodiments described in this document will refer to the requesting application as an application that provides videos or images, such as YouTube. Hosting applications and requesting applications may, however, store, provide and request other types of data. The hosting application storing user activity and the video-providing requesting application are merely examples to help describe the embodiments in this document.

The method of exchanging data between applications of an electronic device 100 may include requesting, by a requesting application 104 of the electronic device 100, permission to access at least one category of data from a hosting application 102 of the electronic device 100. Referring to FIG. 2, requesting application 104 sends an intent to operating system 116, requesting permission from hosting application permission activity 124, at arrow 212. For example, the requesting application 104 may send an intent to operating system 116 requesting video data from the hosting application 102 corresponding to the recent activity of user 202.

The request for permission may be initiated responsive to activation of the requesting application 104. For example, when user 202 activates or starts the video-providing requesting application 104 on the electronic device 100, the requesting application 104 may initiate the request for permission to access at least one category of data from the hosting application 102, which stores the user activity data. The category of data requested by the video-providing requesting application 104 may include any type of user activity data associated with the operation of the video providing requesting application 104, such as prior downloaded videos, prior viewed videos, and what portion of a video was recently viewed. The requesting application 104 may intend to use the requested data as a tool for providing additional data to the user 202.

The request for permission may also be initiated responsive to receiving an indication that data, which corresponds to the at least one category of data, is at the hosting application 102. For example, the requesting application 104 may receive an indication that there is data, at the hosting application 102, associated with the operation of the video providing requesting application 104. The data may be videos recently viewed on a user's desktop and stored at the hosting application content provider 126. The electronic device 100 may receive a wired or wireless signal from the desktop indicating the recently viewed video data on the user's desktop. In response, the requesting application 104 may initiate, at the wireless device 100, the request for permission to access the recently viewed video data on the user's desktop.

The request may include a requesting application identifier that identifies the requesting application 104 and at least one data category identifier that identifies a respective category of data. For example, the request may include an identifier that identifies the requesting application 104 as an application that provides videos or images, such as YouTube. The request may also include at least one data category identifier, such as downloaded videos, recently viewed videos, and what portion of a video was recently viewed. The requesting application identifier may correspond to a requesting application package name and the data category identifier may correspond to a universal resource identifier (URI). A package name may be a unique application identifier used by an operating system to identify the requesting application 104. A URI may include a uniform resource name (URN), defining the identity of the at least one category of data and a Uniform Resource Locator (URL), providing a method for finding it.

In response to the operating system 116 receiving the request for permission to access the at least one category of data from the requesting application 104, the operating system 116 may activate a permission activity 124 of the hosting application 102, at arrow 214.

The method also includes the hosting application 102 causing the device 100 to output (such by displaying on a display 114): (i) an identity of the requesting application; and (ii) the request for permission to access the at least one category of data. Referring to FIG. 2, after permission activity 124 is started, the processor 110 of the electronic device 100, may determine whether the received instruction permits the requesting application 104 to access to the at least one category of data. The determining by the processor 110 may also include determining whether the requesting application package name is permitted to access the at least one category of data corresponding to the URI. After the processor 110 of the electronic device 100 determines whether the received instruction permits the requesting application 104 to access the at least one category of data, the hosting application 102 retrieves the requesting application package name responsive to the received instruction. The requesting application package name may also be retrieved by the hosting application permission activity 124, as shown at arrow 220.

A message is displayed at display 114 or otherwise presented asking user 202 whether to allow the requesting application 104 to access the at least one category of data, which may be identified by a URI, at arrow 216. For example, the message may ask a user whether to allow YouTube access to downloaded videos, recently viewed videos, or a portion of a video that was recently viewed. Optionally, the user may be given the opportunity to impose one or more parameters on the approval. For example, the request for approval may present the user opportunity to approve individual aspects of the request (e.g., the application may obtain titles and dates watched, but not which portions were watched, or on which device the video was watched). If so, when granting an application permission to access the user's information, the system may limit the permission based on the user's approval parameters.

The method also includes detecting, by a processor 110 of the electronic device 100, an input received at the electronic device 100, responsive to the displayed message and receiving, by the hosting application 102 of the electronic device 100, an instruction corresponding to the detected input. Referring to FIG. 2, after the message is displayed, the user 202 may permit access to the at least one category of data via a user interface 106, at arrow 218. For example, the user 202 may permit access to at least one category of data, such as downloaded videos, recently viewed videos, and what portion of a video was recently viewed via user interface 106. The instruction to permit access may then be received by the hosting application 102 of the electronic device 100. The user 202 may also deny access to the at least one category of data.

If the processor 110 determines that the instruction from the user is to permit access to at least one category of data, the hosting application 102 of the electronic device 100 then permits access to the at least one category of data, responsive to the determination, which may include may permitting access to the at least one category of data by the hosting application permission activity 124, at arrow 222. The hosting application permission activity 124 then communicates the result to the operating system 116 indicating that the requesting application 104 is permitted to access the at least one category of data and the operating system 116, in turn, communicates the result to the requesting application 104, at arrow 224. For example, the operating system 116 may communicate the result to the requesting application 104 indicating that YouTube is permitted to access the at least one category of data, such as downloaded videos, recently viewed videos, and what portion of a video was recently viewed.

The requesting application 104 may then request data corresponding to the at least one category of data responsive to the received result by querying for the data corresponding to the URI, at arrow 228. The requesting application 104 may continually request data from the hosting application for the at least one category of data, without needing to invoke the permission activity again. That is, when the requesting application 104 runs, it may have knowledge that permission has been previously granted or rejected for the at least one category of data, and knows whether permission was granted or rejected. Accordingly, the requesting application 104 may not invoke the permission activity again. It is contemplated, however, that the permission activity may occur at least periodically, and in certain embodiments each time that the requesting application wants to request data from the hosting application. For example, once permission is granted, the permission activity may not be required to be invoked again until a time period expires, until the user logs out or the user session ends, or until another time or activity threshold has been passed. In other words, once granted a permission may be maintained until such a time or activity threshold has been passed.

The operating system 116 may then check with its own internal records to see if the requesting application 104 has permission to access the hosting application's data with the given URI, at arrow 230. The operating system 116 may then request the data from the hosting application content provider 126 by querying for the data corresponding to the URI, at arrow 232. After the data is requested, the data may be extracted from the hosting application by the operating system and then received by the requesting application.

Figure 3:
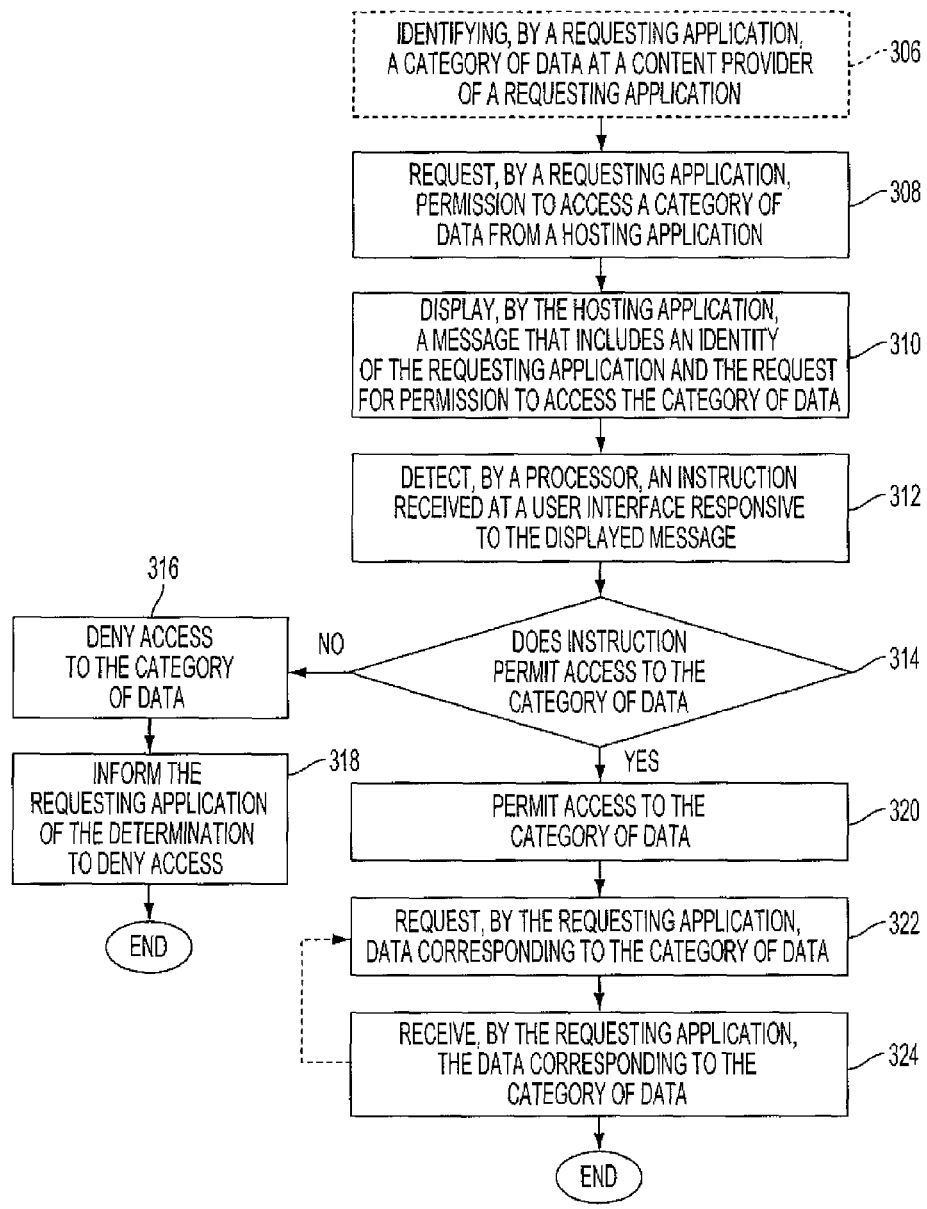
FIG. 3 is a flowchart illustrating steps of a method of exchanging data between applications of an electronic device.

FIG. 3 is a flowchart illustrating steps of a method of exchanging data between applications of an electronic device. Referring to FIG. 3, at 306, the requesting application 104 of electronic device 100 may identify at least one category of data provided by hosting application content provider 126 independent from the activation of either the hosting application 102 or the requesting application 104. For example, the requesting application 104 may identify the video data provided by the hosting application 102. The identified data may be videos recently viewed on a user's desktop and stored at the hosting application content provider 126. The electronic device 100 may receive a wired or wireless indication from the desktop indicating the recently viewed video data on the user's desktop. In response to receiving the wired or wireless indication, the requesting application 104 may identify the video data at the wireless device 100.

At 308, on activation, if the requesting application 104 has not previously requested permission to access the at least one category of data from the hosting application of the electronic device, the requesting application of the electronic device may request permission to access the at least one category of data from the hosting application of the electronic device. For example, the requesting application 104 may request video data from the hosting application 102 corresponding to the recent activity of user 202.

The hosting application 102 may then display a message at display 114 on the electronic device 100, or otherwise output the message such as by an audio or tactile output, at 310. The message may include displaying (i) an identity of the requesting application 104 and (ii) the request for permission to access the at least one category of data. For example, the message may include displaying the identity of the video-providing requesting application 104, such as YouTube. The message may include displaying the request for permission to access the video data from the hosting application 102 corresponding to the recent activity of user 202. The displayed message may prompt the user to select between (i) permitting the requesting application to access the at least one category of data and (ii) denying the requesting application access to the at least one category of data. For example, the message may prompt the user to either select a first option permitting the video-providing requesting application 104 to access user activity video data from the hosting application or select a second option denying the video-providing requesting application 104 access to the user activity video data. The memory 108 may include instructions that instruct the processor 110 to cause the device to output the message.

The user interface 106 may be configured to receive the user instruction permitting the requesting application 104 to access the at least one category of data. The user interface 106 may also be configured to receive the user instruction denying the requesting application 104 access to the at least one category of data. The user 202 may select an option at the user interface 106 in a number of ways, including: typing a reply, such as YES or NO, touching a touch-sensitive input component that is integrated with the display 114, such as a capacitive, resistive or other type of touch screen and speaking a reply of YES or NO using a voice recognition system.

The processor 110 of the electronic device 100 may detect an instruction received at user interface 106 of the electronic device 100, responsive to the displayed message, at 312. For example, processor 110 may detect an instruction via user interface 106 permitting the video-providing requesting application 104 to access user activity video data from the hosting application. Alternatively, processor 110 may detect an instruction via user interface 106 denying the video-providing requesting application 104 access user activity video data from the hosting application 102.

The processor 110 of the electronic device 100 may then determine whether to permit the requesting application 104 access to the at least one category of data based on the detected instruction, at 314. If the processor 110 determines that the instruction from user 202 is to deny access to the at least one category of data, at 316, the operating system 116 stores that denial of permission internally and the requesting application 104 is informed that the request is denied at 318.

If the processor 110 determines that the instruction from user 202 is to permit access to the at least one category of data, at 320, the processor 110 informs the operating system to grant the permission, the operating system 116 stores that grant of permission internally and the requesting application 104 may request data corresponding to the category of data, at 322. At 324, the data corresponding to the category of data is then received by the requesting application 104. The requesting application 104 may continually request data from the hosting application for the at least one category of data, without needing to invoke the permission activity again, as indicated by the dotted lines between 324 and 322.

Figure 4:
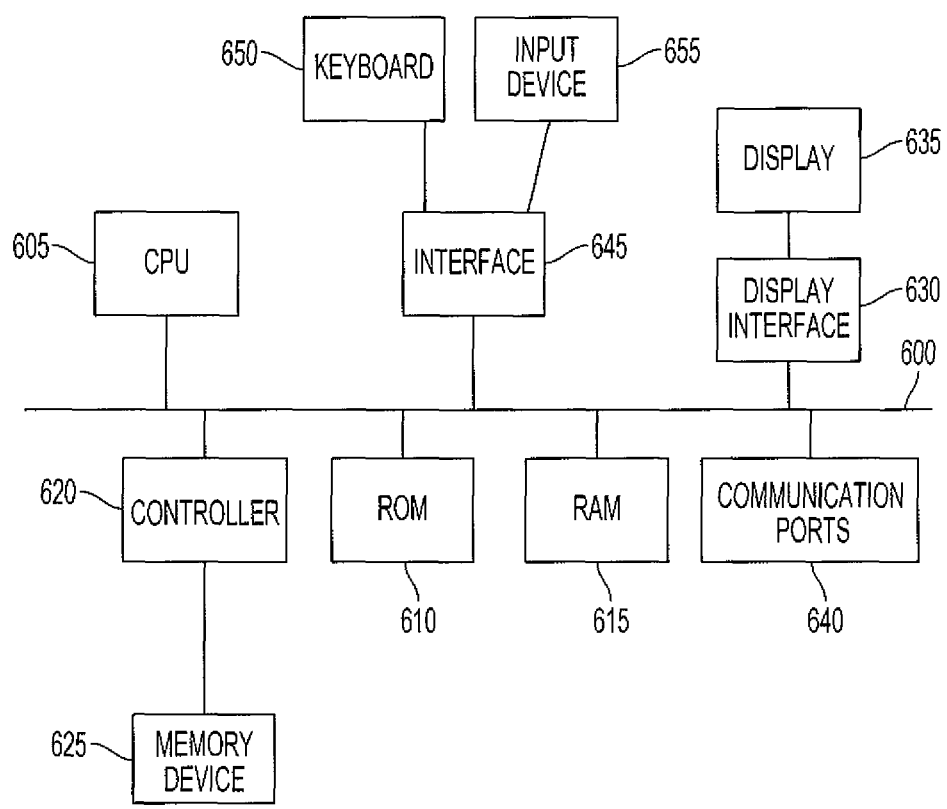
FIG. 4 is a block diagram illustrating elements that may be included in hardware of an electronic device.

FIG. 4 depicts a block diagram of internal hardware that may be used to contain or implement the various services and processing devices as discussed above. A bus 600 serves as the main information highway interconnecting the other illustrated components of the hardware. CPU 605 is a processor, the central processing unit of the system that performs calculations and logic operations required to execute a program. CPU 605, alone or in conjunction with one or more of the other elements disclosed in FIG. 4, is a processing device, computing device or processor as such terms are used within this disclosure. Read only memory (ROM) 610 and random access memory (RAM) 615 constitute exemplary memory devices.

A controller 620 provides an interface between with one or more optional tangible, computer-readable memory devices 625 and the system bus 600. These memory devices 625 may include, for example, an external or internal DVD or CD ROM drive, a hard drive, flash memory, a USB drive or the like. As indicated previously, these various drives and controllers are optional devices. Additionally, the memory devices 625 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any of the methods and systems as discussed above may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-Ray™ disc, and/or other recording medium.

An optional display interface 640 may permit information from the bus 600 to be displayed on the display 645 in audio, visual, graphic or alphanumeric format. The information may include information related to a current job ticket and associated tasks. Communication with external devices may occur using various communication ports 650. An exemplary communication port 650 may be attached to a communications network, such as the Internet or an local area network.

The hardware may also include an interface 655 which allows for receipt of data from input devices such as a keyboard 660 or other input device 665 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An electronic device, comprising:
   a processor;
   a hosting application;
   a requesting application; and a non-transitory, computer-readable memory containing program instructions that, when executed, cause the processor to:
  receive a request from the requesting application for permission to access a category of data from the hosting application, wherein the request includes:
    a requesting application identifier that identifies the requesting application and which corresponds to a requesting application package name, and
    a category identifier that identifies a category of data and which corresponds to a universal resource identifier;
  cause the hosting application to output an identity of the requesting application and the request;
  detect a received input that is responsive to the output;
  cause the hosting application to receive an instruction corresponding to the received input;
  cause the hosting application, in response to the received instruction, to retrieve the requesting application package name;
  determine that the received instruction permits the requesting application to access the category of data, wherein the determining includes determining whether the requesting application package name is permitted to access the category of data corresponding to the universal resource identifier;
  cause the hosting application to permit access to the category of data, wherein the permitting access includes permitting, by a hosting application permission activity, access to the category of data;
  communicate a result to the requesting application indicating that the requesting application is permitted to access the category of data;
  confirm with the hosting application permission activity that the requesting application is permitted to access the category of data; and
  receive, from the requesting application in response to the result, data corresponding to the category of data.

2. The electronic device of claim 1, further comprising: an operating system; and
  additional program instructions that, when executed, cause the processor to:
    receive the request for permission to access the category of data from the requesting application, and
    cause the operating system to activate a permission activity of the hosting application responsive to the request for permission, wherein the permission activity of the hosting application outputs the identity of the requesting application and the category of data.

3. The electronic device of claim 2, wherein the instructions to communicate the result to the requesting application comprise instructions to: cause the hosting application permission activity to communicate the result to the operating system; and
  cause the operating system to communicate the result to the requesting application.

4. The electronic device of claim 2, further comprising additional program instructions that, when executed, cause the processor to:
  cause the operating system to extract data from the hosting application corresponding to the category of data; and
  cause the requesting application to receive the extracted data from the hosting application.

5. The electronic device of claim 4, wherein:
  the hosting application includes a hosting application content provider;
  the instructions that cause the operating system to extract data from the hosting application comprise instructions to extract data from the hosting application content provider.

6. The electronic device of claim 1, further comprising additional program instructions that, when executed, cause the processor to initiate the request for permission to access the category of data in response to receiving an indication that data which corresponds to the category of data is at the hosting application.

7. The electronic device of claim 1, further comprising additional program instructions that, when executed, cause the processor to initiate the request for permission to access the category of data in response to activation of the requesting application.

8. An electronic device, comprising:
  a processor;
  an operating system;
  a hosting application;
  a requesting application; and
  a non-transitory, computer-readable memory containing program instructions that, when executed, cause the processor to:
    receive a request from the requesting application for permission to access a category of data from the hosting application, wherein the request includes:
      a requesting application identifier that identifies the requesting application and which corresponds to a requesting application package name, and
      a category identifier that identifies a category of data and which corresponds to a universal resource identifier;
    cause the hosting application to output an identity of the requesting application and the request;
    detect a received input that is responsive to the output;
    cause the hosting application to receive an instruction corresponding to the received input;
    cause the hosting application, in response to the received instruction, to retrieve the requesting application package name;
    determine that the received instruction permits the requesting application to access the category of data, wherein the determining includes determining whether the requesting application package name is permitted to access the category of data corresponding to the universal resource identifier;
    cause the hosting application to permit access to the category of data, wherein the permitting access includes permitting, by a hosting application permission activity, access to the category of data;
    cause communication to the operating system of a result indicating that the requesting application is permitted to access the category of data, and subsequently cause the operating system to communicate the result to the requesting application;
    confirm with the hosting application permission activity that the requesting application is permitted to access the category of data; and
    receive, from the requesting application in response to the result, data corresponding to the category of data.

9. The electronic device of claim 8, further comprising additional program instructions that, when executed, cause the processor to:
  cause the operating system to receive the request for permission to access the category of data from the requesting application; and enable the operating system to activate a permission activity of the hosting application responsive to the request for permission, wherein the permission activity of the hosting application outputs the identity of the requesting application and the category of data.

10. The electronic device of claim 8, further comprising additional program instructions that, when executed, cause the processor to:
enable the operating system to extract data from the hosting application corresponding to the category of data; and
cause the requesting application to receive the extracted data from the hosting application.

11. The electronic device of claim 10, wherein:
the hosting application includes a hosting application content provider;
the instructions that enable the operating system to extract data from the hosting application comprise instructions that enable extracting data from the hosting application content provider.

12. The electronic device of claim 8, further comprising additional program instructions that, when executed, cause the processor to initiate the request for permission to access the category of data from the hosting application in response to receiving an indication that data which corresponds to the category of data is at the hosting application.

13. The electronic device of claim 8, further comprising additional program instructions that, when executed, cause the processor to initiate the request for permission to access the category of data from the hosting application in response to activation of the requesting application.

14. A non-transitory, computer-readable medium containing programming instructions that are configured to cause a processor of an electronic device to:
receive a request from a requesting application for permission to access a category of data from a hosting application, wherein the request includes:
a requesting application identifier that identifies the requesting application and which corresponds to a requesting application package name, and
a category identifier that identifies a category of data and which corresponds to a universal resource identifier;
cause an output of an identity of the requesting application and the request;
detect a received input that is responsive to the output;
cause the hosting application to receive an instruction corresponding to the received input;
cause the hosting application, in response to the received instruction, to retrieve the requesting application package name;
determine that the received instruction permits the requesting application to access the category of data, wherein the determining includes determining whether the requesting application package name is permitted to access the category of data corresponding to the universal resource identifier;
cause the hosting application to permit access to the category of data, wherein the permitting access includes permitting, by a hosting application permission activity, access to the category of data;
communicate a result to the requesting application indicating that the requesting application is permitted to access the category of data;
confirm with the hosting application permission activity that the requesting application is permitted to access the category of data; and
receive, from the requesting application in response to the result, data corresponding to the category of data.

15. The computer-readable medium of claim 14, further comprising additional programming instructions that are configured to cause the processor to:
receive the request for permission to access the category of data from the requesting application, and
cause an operating system to activate a permission activity of the hosting application responsive to the request for permission, wherein the permission activity of the hosting application outputs the identity of the requesting application and the category of data.

16. The, computer-readable medium of claim 15, further comprising additional programming instructions that are configured to cause the processor to:
cause the operating system to extract data from the hosting application corresponding to the category of data; and
cause the requesting application to receive the extracted data from the hosting application.

17. The computer-readable medium of claim 14, further comprising additional programming instructions that are configured to cause the processor to initiate the request for permission to access the category of data in response to at least one of the following:
receiving an indication that data which corresponds to the category of data is at the hosting application; or
activation of the requesting application.

18. A non-transitory, computer-readable medium containing programming instructions that are configured to cause a processor of an electronic device to:
receive a request from a requesting application for permission to access a category of data from a hosting application, wherein the request includes:
a requesting application identifier that identifies the requesting application and which corresponds to a requesting application package name, and
a category identifier that identifies a category of data and which corresponds to a universal resource identifier;
cause an output of an identity of the requesting application and the request;
detect a received input that is responsive to the output;
cause the hosting application to receive an instruction corresponding to the received input;
cause the hosting application, in response to the received instruction, to retrieve the requesting application package name;
determine that the received instruction permits the requesting application to access the category of data, wherein the determining includes determining whether the requesting application package name is permitted to access the category of data corresponding to the universal resource identifier;
cause the hosting application to permit access to the category of data, wherein the permitting access includes permitting, by a hosting application permission activity, access to the category of data;
cause communication to an operating system of a result indicating that the requesting application is permitted to access the category of data, and subsequently cause the operating system to communicate the result to the requesting application;
confirm with the hosting application permission activity that the requesting application is permitted to access the category of data; and
receive, from the requesting application in response to the result, data corresponding to the category of data.

19. The computer-readable medium of claim 18, further comprising additional programming instructions that are configured to cause the processor to:

cause the operating system to receive the request for permission to access the category of data from the requesting application; and enable the operating system to activate a permission activity of the hosting application responsive to the request for permission, wherein the permission activity of the hosting application outputs the identity of the requesting application and the category of data.

20. The computer-readable medium of claim 18, further comprising additional programming instructions that are configured to cause the processor to:

enable the operating system to extract data from the hosting application corresponding to the category of data; and cause the requesting application to receive the extracted data from the hosting application.

21. The computer-readable medium of claim 18, further comprising additional programming instructions that are configured to cause the processor to initiate the request for permission to access the category of data in response to at least one of the following:

receiving an indication that data which corresponds to the category of data is at the hosting application; or activation of the requesting application.

\* \* \* \* \*